United States Patent
Kasztenny et al.

(10) Patent No.: US 6,829,544 B1
(45) Date of Patent: Dec. 7, 2004

(54) LINE CURRENT DIFFERENTIAL PROTECTIVE RELAYING METHOD AND RELAY FOR IN-ZONE TAPPED TRANSFORMERS

(75) Inventors: Bogdan Z. Kasztenny, Markham (CA); Colin Bruce Campbell, Ajax (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/546,280

(22) Filed: Apr. 10, 2000

(51) Int. Cl.$^7$ ................................................ H02H 3/00
(52) U.S. Cl. ........................... 702/59; 702/58; 702/64; 702/65; 700/292; 361/80
(58) Field of Search .......................... 702/57–59, 64, 702/65, 124, 126, 122, 115, 185, 188, 189, FOR 103, FOR 104, FOR 106, FOR 111, FOR 134, FOR 170, FOR 171; 700/22, 79, 292–294; 361/62–65, 78, 80, 81, 87, 93.1, 35, 36, 38, 45, 66, 42, 160; 324/522, 525, 521

(56) References Cited

U.S. PATENT DOCUMENTS

| | | | |
|---|---|---|---|
| 4,715,000 A | 12/1987 | Premerlani | 702/126 |
| 5,809,045 A | 9/1998 | Adamiak et al. | 714/799 |
| 5,838,525 A * | 11/1998 | Ward et al. | 361/69 |
| 5,956,220 A * | 9/1999 | Novosel et al. | 361/62 |
| 6,256,592 B1 * | 7/2001 | Roberts et al. | 702/59 |
| 6,356,421 B1 * | 3/2002 | Guzman-Casillas et al. | 361/36 |

OTHER PUBLICATIONS

Schuster, N., "Protection of multi–terminal lines for high voltage systems", Elektrizitaetswirtschaft, 2000, vol. 99, No. 7, pp. 12–13, 16–17, XP001035298, no month.

Teliani, M. et al., "Simulation of an adaptive distance relay for protecting tapped circuits", XPOO2181047, 1993, no month.

* cited by examiner

*Primary Examiner*—Hal Wachsman
(74) *Attorney, Agent, or Firm*—Hunton & Williams LLP

(57) ABSTRACT

A line current differential protective relay and method for protecting transmission lines with power transformers tapped between the substations without any measurements taken at the tap point. The protection method uses distance supervision by an overcharging instantaneous impedance zone to prevent malfunction of the relay during external faults at the distribution busbar of the tapped transformer. The protection method uses modified current differential principle that compares the zero sequence compensated differential and restraining signals to provide relay stability on external ground faults. The protection method combines both the traditional and modified current differential principles to provide phase-selective operation.

16 Claims, 4 Drawing Sheets

LINE CURRENT DIFFERENTIAL PROTECTIVE RELAYING METHOD AND RELAY FOR IN-ZONE TAPPED TRANSFORMERS

BACKGROUND OF THE INVENTION

The invention generally relates to protection of power overhead transmission lines and cables where the protected line (or cable) has a transformer (or transformers) tapped between the substations. More particularly, the present invention allows the application of well-known current differential protection principles without measuring the currents at the line terminals of the tapped transformer.

An overhead power transmission line or a cable—referred to as a "line" in this document—can be protected in a variety of ways. The applied protection solution depends on the line voltage level, line configuration, importance of the protected line for the power system as a whole, as well as available communication means and bandwidth for the protection equipment.

Among known protection techniques, the overcurrent protection principle is perhaps the simplest. The principle relies on the magnitude of the current and classifies situations with excessive currents as fault conditions. The principle has many versions including directional and voltage supervision, and definite or current-dependent time-delayed operation. With all these enhancements the overcurrent principle can be applied to certain line configurations only; primarily, on the power distribution level.

The distance protection principle derives an "apparent" impedance from the voltages and currents measured at the substation and associated with the protected line. The technique for measuring the impedance (either directly or indirectly) insures that the apparent impedance—for any type of fault—is proportional to the actual geometrical distance from the substation to the fault position. Distance relays are capable of locating faults on the line with precision, at least in ideal conditions. Thus, they can protect complex line configurations. In actual situations, however, several factors affect accuracy of distance relays. In order to avoid malfunction of a distance relay on near external faults, the relay reach cannot be set to 100% of the line length but it is set usually at 70–90% depending on the quality of the applied protection equipment.

In order to protect the entire line, several time-delayed overreaching distance zones are usually used. This is known as a stepped distance protection scheme.

By exchanging at least one bit of information, two distance relays installed at both ends of a protected line can be arranged into a so-called pilot scheme. A pilot scheme can be organized either using a permissive or blocking logic and always ensures much more reliable protection comparing with two individual distance relays without any means of communication. There are situations, however, such as simultaneous external and internal faults, where the distance-based pilot scheme may fail to provide reliable protection. Sensitivity of distance protection schemes is another limitation.

The line current differential principle is another protection technique. It compares the currents, typically the current phasors, at both the terminals of the protected line. In the case of an external fault the currents match almost perfectly; while during internal faults, the difference is significant. A line current differential relay creates internally a signal proportional to the difference between the locally measured current and the remote current (the differential current or signal). To cope with line charge currents, and transformation errors of the Current Transformers (CTs) including saturation, the percentage differential principle is used. The differential current is not compared against a threshold but against a specially formed restraining current. Various types of operate/no-operate characteristics can be used to accomplish the percentage current differential characteristic.

There are typically several requirements of the current differential protection principle. First, significant amounts of information must be exchanged over long distances (tens or hundreds of kilometers). Microprocessor-based protective relays exchange their locally measured current phasors in a digital form over a communication channel set up using fiber optic links, microwave channels or some other physical medium.

Second, the microprocessor-based relays at both line terminals must be accurately synchronized in order to measure the line terminal currents at the same time instances. This is accomplished utilizing, for example, well-known Global Positioning System (GPS) as a source of a absolute clock or using some other techniques for self-synchronization of two or more line current differential relays. Such a technique is described in U.S. Pat. No. 4,715,000.

Third, the circuits connected to the protected line such as tapped lines or transformers must be monitored current-wise in order to apply the current differential protection principle. This may create a problem as the tapped connections are meant to provide a cost-effective alternative to actual substations. The taps are made outside the main substations, they are rarely equipped with proper protection means such a Circuit Breakers (CBs) and CTs. Also, high-speed communication from the tap position may be a problem. This either limits application of line current differential relays on tapped lines or makes the tapped line connections economically less attractive.

Presently-known techniques do not adequately address these problems.

SUMMARY OF THE INVENTION

The present invention overcomes the problems described above, and achieves additional advantages, by providing for a method or system to apply the line current differential relay to protect tapped lines without the measurements at the tap.

According to exemplary embodiments, the current differential relays are made immune to the load current drawn by the tapped transformer under normal system conditions and to the fault current for faults at the distribution busbar of the tapped transformer. This is accomplished by adding distance supervision to the line current differential scheme. The differential scheme is permitted to trip only if the appropriately set distance relay sees the fault within its operating zone.

The disclosed embodiments use a distance protection element, either as a part of the line current differential integrated protective relay or implemented as a separate relay integrated with the line current differential relay, to supervise the operation of the latter. The distance element is set to detect the faults located on the protected transmission line, and within the tapped transformer, but not the faults located at the distribution busbar of the tapped transformer. As the tapped transformers are of relatively low power, their impedance is relatively high; thus, a reach setting meeting the above requirements is possible. The distance zone is set as an instantaneous zone overreaching the line length with a security margin with respect to the distribution busbar of the tapped transformer. The zone may be set as an overreaching zone because the differential protection element is capable of distinguishing faults on the line or the tapped transformer from the faults outside the line.

Another obstacle is associated with external ground faults. The tapped transformers have typically their primary winding, i.e. the winding coupled to the line, wye-connected with a grounded neutral, and as such, they create a path for the zero sequence current during ground faults. Thus, if an external ground fault occurs, the zero sequence current is fed by the tapped transformer and the current balance monitored by the line differential relay as the differential signal gets upset. The differential scheme would see significant differential current and would malfunction on external ground faults, despite the distance supervision if the external fault is located within the overreaching distance zone.

To overcome this problem, exemplary embodiments of the present invention subtract the zero sequence current from the currents at both line terminals prior to calculating the differential signal. Owing to this, the differential signal is insensitive to the zero sequence component of the current and the current differential scheme becomes stable on external ground faults.

Subtracting the zero sequence current from the differential signal would, however, degrade relay sensitivity by approximately $\frac{1}{3}^{rd}$ on internal single line to ground faults. To maintain sensitivity, the zero sequence component is subtracted when calculating the restraining signal as well.

Another problem generated by the operation of subtracting the zero sequence component from the differential and restraining signals is that the phase-selective operation of the current differential principle would be lost. Normally, the differential relay is implemented on the per phase basis and responds selectively to various types of faults. Particularly, if a single line to ground fault occurs, the relay can trip—if programmed to do so—the CB only in the defective phase (single pole tripping). This is typically followed by the operation of autoreclosing the breaker after a pre-defined time interval in anticipation of a fault to disappear by itself. This keeps the line in service and ensures certain power transfer between the substations.

When the zero sequence current is removed from the differential current, the differential currents in the healthy phases during an internal single line to ground faults would equal approximately $\frac{1}{3}^{rd}$ of the fault current. The restraining current would be to too low to prevent relay malfunction in the healthy phases. Consequently, the relay that compensates for the zero sequence current would always trip all three phases. To prevent that the present invention uses both the traditional line current differential characteristic and the modified (zero sequence compensated) line current differential characteristic in parallel, The first one tends to overtrip on external faults. The latter tends to overtrip healthy phases on internal faults. To solve the problem the two differential characteristics supervise each other mutually and the phase-selective operation is regained.

In accordance with the disclosed embodiments, a power line with a tapped transformer can be protected by current differential relays installed exclusively in the substations, without degrading sensitivity and phase-selectivity of the protection on internal faults nor jeopardizing relay stability on external faults.

BRIEF DESCRIPTION OF THE DRAWINGS

The present invention and its resulting advantages can be more fully understood by reading the following Detailed Description in conjunction with the accompanying drawings, in which.

DETAILED DESCRIPTION OF THE INVENTION

A. Introduction

Figure 1:
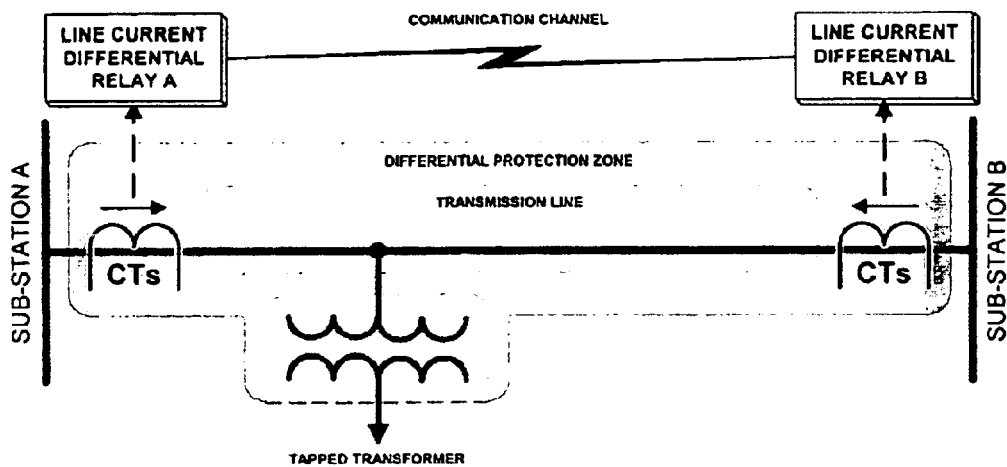
FIG. 1 shows an arrangement of a power line between the substations A and B with a power transformer tapped at the position T. The differential protection zone is bounded by the CTs and includes a portion of transformer windings.

With reference to FIG. 1 a line current differential scheme comprises of two relays measuring the currents at both terminals of the protected line (or three relays for three terminal lines) through two sets of CTs, and of a communication channel that enables the relays to exchange the locally measured currents. Each relay combines its locally measured currents with the remote currents and the differential (subscript D) and restraining (subscript R) currents are calculated as follows:

$$I_D = I^A I^B \tag{1}$$

$$I_R = |I^A| + |I^B| \tag{2a}$$

In equation (1) and the following description the superscripts stand for stations, while the subscripts stand for phases or other notation.

The formulae (2a) for the restraining current is generic. Practical realizations include, but are not limited to:

$$I_R = (|I^A|, |I^B|) \tag{2b}$$

$$I_R = \sqrt{|I^A| \cdot |I^B|} \tag{2c}$$

$$I_R = |I^A| + |I^B| + \delta \tag{2d}$$

where $\delta$ in equation (2d) is an extra restraining factor calculated based on the noise in the input signals as described in U.S. Pat. No. 5,809,045.

The particular definition of the restraining signal is not important to the present discussion, as the disclosed embodiments will work with any suitably-defined restraining signal.

For purposes of explanation, description it is assumed that the current phasors are used; however, it will be appreciated that instantaneous current values can also be used. Further, while the present invention works for three- and multi-terminal lines, the method will be explained assuming a two-terminal line case.

Figure 2:
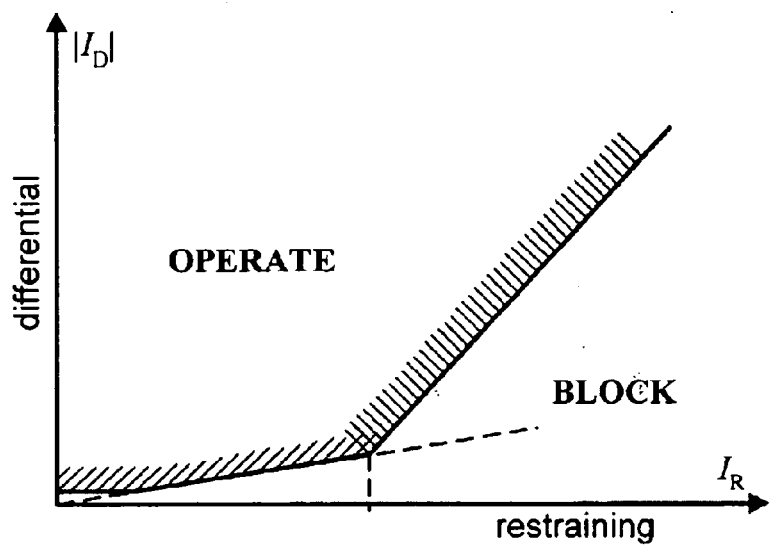
FIG. 2 presents a sample two-slope operating characteristic of the current differential element on the differential—restraining plane.

The differential and restraining signals are subjected to the operating characteristic, and a corresponding flag is set if the differential—restraining point falls into the operate region. FIG. 2 depicts an exemplary two-slope characteristic. It should be noted, however, that the present invention is applicable with any differential characteristic including the one that uses a dynamic restraint as given by equation (2d).

B. Distance Supervision

Figure 3:
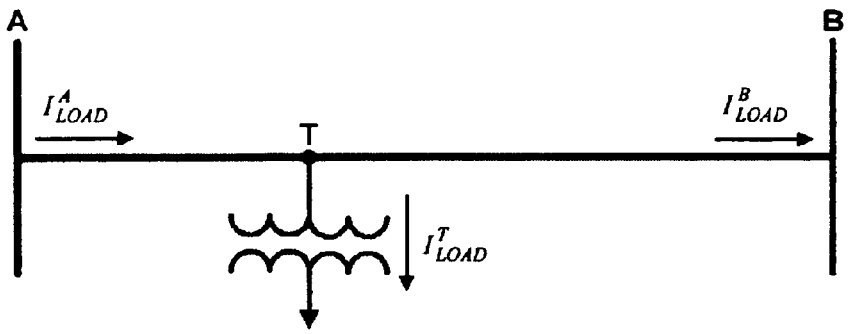
FIG. 3 depicts normal load conditions with the power transferred from the substation A to B. The load current drawn by the tapped transformer appears as the differential signal.

In the case of a transmission line with a tapped transformer, certain load current is drawn from the line by the transformer in normal load conditions as shown in FIG. 3. Consequently, the differential signal calculated by the relays would be:

$$I_D = I_{LOAD}^A - I_{LOAD}^B = I_{LOAD}^T \qquad (3)$$

At the same time the restraining current, regardless of the applied approach, would be close to the line load current. The differential current of equation (3) may be high enough as compared with the restraining current to cause the operation of the differential protection element. Distance supervision as described later can be applied to solve this problem.

Another problem originates from external faults at the distribution bus of the tapped transformer. The current differential relay may be sensitive enough to see such faults, but preferably should not operate as the line does not need to be taken out of service in the case of a fault outside the line and the tapped transformer. A distance supervision as described later can be applied to solve this problem.

Yet another problem occurs when the line is energized. One breaker gets closed energizing the line and the tapped power transformer while the other remains open. In such conditions, the differential and restraining currents are equal. At the same time, the tapped transformer draws significant inrush magnetizing current. The differential relay may malfunction in such conditions. Distance supervision can be applied to solve this problem.

Figure 4:
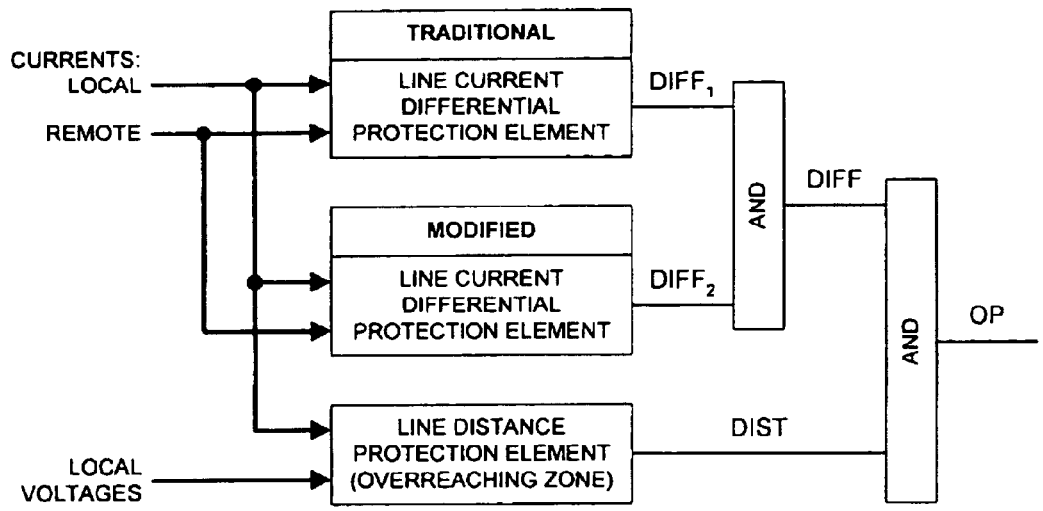
FIG. 4 presents an overall logic diagram of the present invention.

With reference to FIG. 4, a line distance protection element or a separate relay supervises operation of the line current differential element (the AND gate producing the operate signal, OP).

In one embodiment, reach of the line distance protection element is preferably set to achieve the following objectives:

a) The distance element should not see faults at the distribution busbar of the tapped transformer.

b) The distance element should see faults along the entire line.

c) The distance element should not operate during transformer energization due to magnetizing inrush currents.

As the rated power of tapped transformers is relatively small compared with the typical power transfer through the protected line, it is reasonable to assume that conditions a) and b) can be met simultaneously in majority of practical applications.

Suitable filtering can be implemented in conventional microprocessor-based distance relays to meet the requirement c) in conjunction with a) and b).

Figure 5:
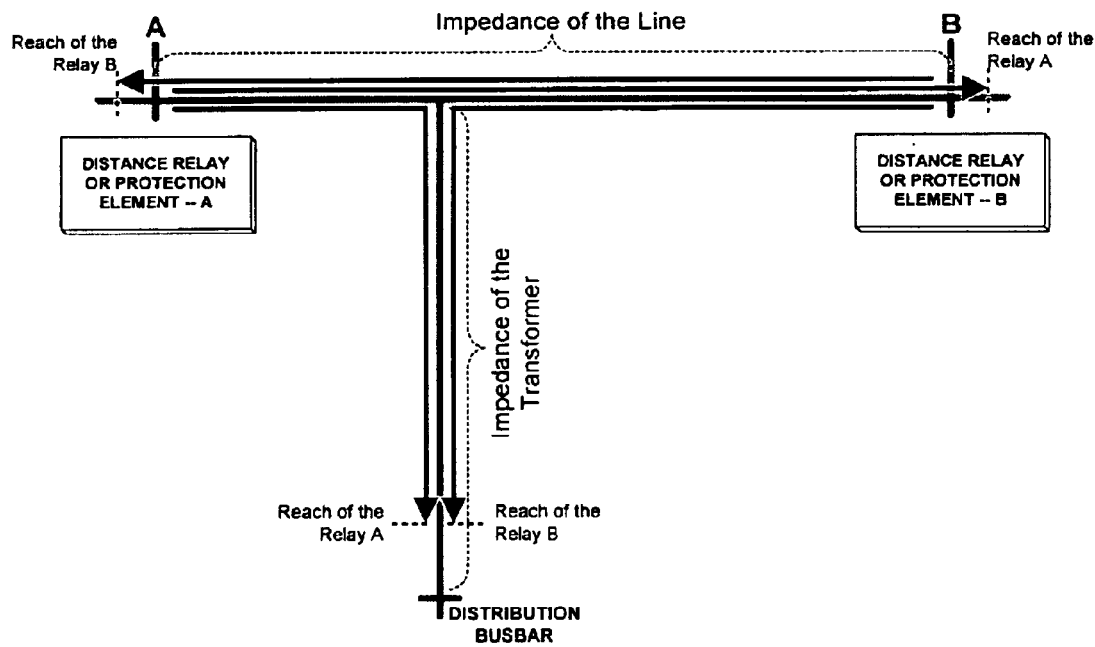
FIG. 5 illustrates the distance supervision.

FIG. 5 illustrates the distance supervision principle.

C. Removal of the Zero Sequence Current

Figure 6:
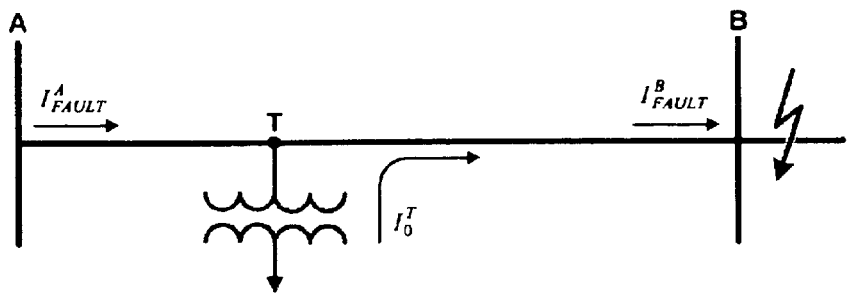
FIG. 6 depicts external ground fault conditions. The transformer tapped within the differential zone generates the zero sequence current that is present at the substation B but it is not present at the substation A. This creates a spurious differential signal.

During external ground faults as depicted in FIG. 6, the positive, negative and zero sequence currents would flow through the line from the substation A to the substation B without upsetting the current balance between the line terminals (assuming the tapped transformer is not connected to the source of power which is the practical case). An additional zero sequence current, however, would be generated by the transformer if its primary winding is wye-connected and grounded (which is a practical case). The zero sequence current would flow towards the fault through one substation only (the substation B in FIG. 6). This would create a spurious differential signal as follows:

$$I_D = I_{FAULT}^A - I_{FAULT}^B = I_0^T \qquad (4)$$

At the same time the restraining current, regardless of the applied approach, would be close to the line load current in the healthy phases and close to the fault current in the faulted phases. In both the cases, the spurious differential signal is likely to be high enough to cause relay malfunction.

To solve this problem, the zero sequence current can be subtracted from the phase current prior to calculating the differential signal. Such a modified differential signal can be calculated as (phase A shown, phases B and C are treated accordingly):

$$I_{DA\ MOD} = I_A^A - I_0^A + I_A^B - I_0^B = I_{A\ MOD}^A I_{A\ MOD}^B \qquad (5)$$

The modified differential current calculated as (5) does not respond to any zero sequence currents during external faults. The differential currents in all three phases would be zero for any type of external fault.

However, during ground internal faults the modified differential current calculated as (5) would be smaller comparing with the traditional current (1) and the relay sensitivity would be degraded. To maintain relay sensitivity, the restraining current is modified accordingly (definition (2d) of the restraining current is used below for illustration):

$$I_{RA\ MOD} = |I_{A\ MOD}^A| + |I_{A\ MOD}^B| + \delta \qquad (6)$$

Equation (6) provides just an example. It should be noted that the calculation of the restraining signal from the phase currents after removing the zero sequence component works with any definition of the restraining signal.

Once the modified differential and restraining signals are created by the relay, they are subjected to the differential characteristic and the output operate flag, $DIFF_2$, is created. As in the case of a traditional current differential technique, this is done on the per phase basis.

D. Phase-Selective Operation

Removing the zero sequence current from the differential current ensures relay stability during external ground faults. This operation, however, would cause a problem as the current differential relay would operate in all three phases for any internal ground fault, and consequently, the advantage of a phase-selective operation would be lost. This is so because the fault current in one (single line to ground fault) or two phases (line to line to ground fault) contains significant zero sequence component. That component is than subtracted from the small load current in the healthy phase (or phases) creating a large differential signal as compared with the restraining signal in the healthy phase (phases).

To regain the phase-selective operation, it is preferable to use both the traditional and modified (zero sequence compensated) differential characteristics.

The traditional characteristic, setting the flag $DIFF_1$ in FIG. 4, shows a tendency to overtrip on external ground faults, but is phase-selective on internal faults. The modified characteristic, setting the flag $DIFF_2$ in FIG. 4, shows a tendency to overtrip healthy phases on internal faults, but it is stable on external faults. Therefore the two characteristics should supervise each other mutually (the AND gate in FIG. 4). The resulting per-phase operands $DIFF_A$, $DIFF_B$ and $DIFF_C$ retain both stability on external faults and phase-selectivity on internal faults. The latter enables proper identification of a faulted phase for the single-pole tripping mode.

Figure 7:
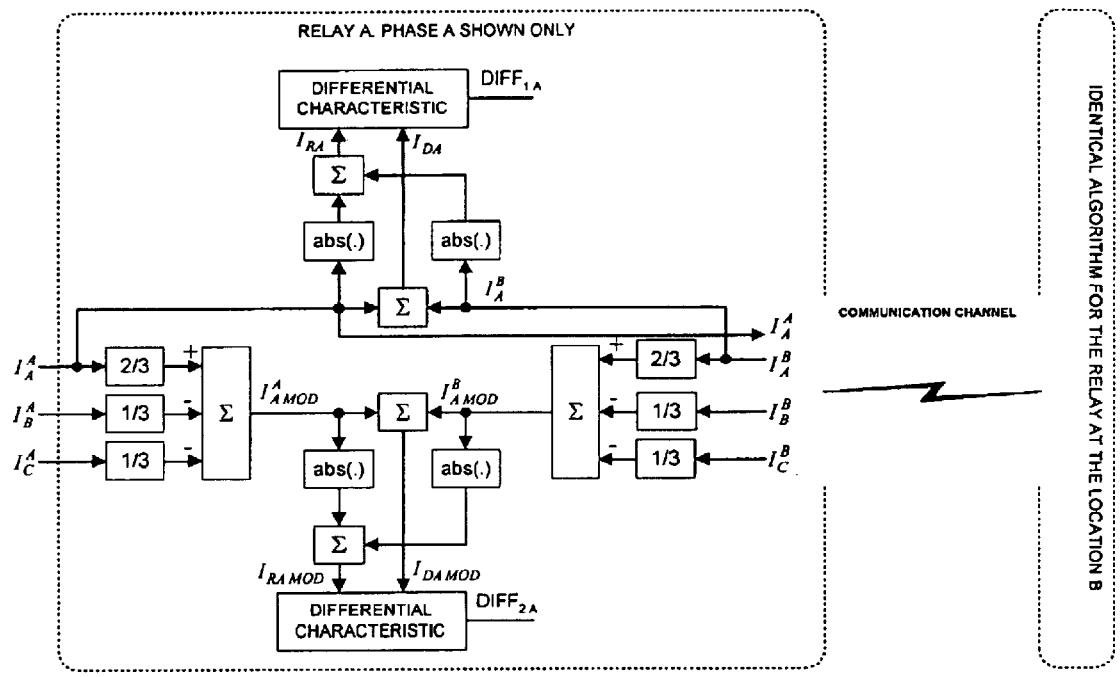
FIG. 7 presents a detailed block diagram of the improved current differential algorithm. The figure should be read in conjunction with FIG. 6 which shows how the $DIFF_1$ and $DIFF_2$ flags are used to create the operate signal, OP.

FIG. 7 depicts one possible implementation of the two differential characteristics.

An alternative way of implementing the two characteristics is to dynamically select the effective differential current out of the traditional and modified differential currents according to the following equations:

$$I_{DA\ EFFECTIVE} = \min(|I_{DA}|, |I_{DA\ MOD}|) \quad (7)$$

and than select the corresponding restraining current depending on the selection of the differential current.

Figure 8:
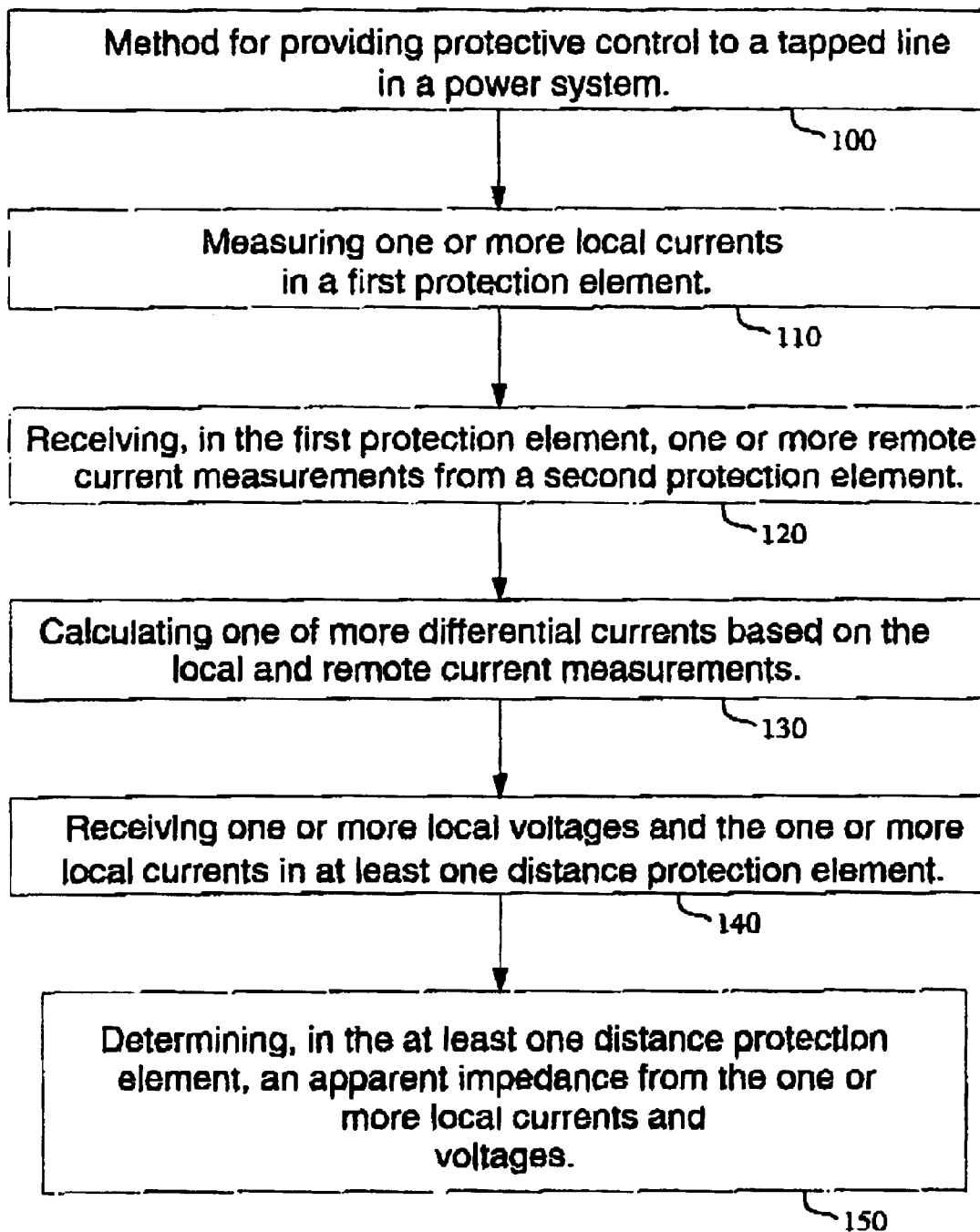
FIG. 8 is a flowchart showing a process in accordance with one embodiment of the invention.

In further explanation, FIG. 8 is a flowchart showing a process in accordance with one embodiment of the invention. That is, FIG. 8 shows a method for providing protective control to a tapped line in a power system The method of FIG. 8 starts in step 100 and passes to step 110. In step 110, the method includes measuring one or more local currents in a first protection element. The method then passes to step 120. In step 120, the method includes receiving, in the first protection element, one or more remote current measurements from a second protection element. Then, in step 130, the method includes calculating one or more differential currents based on the local and remote current measurements. After step 130, the method of FIG. 8 passes to step 140. In step 140, the method includes receiving one or more local voltages and the one or more local currents in at least one distance protection element. After step 140, the method passes to step 150. In step 150, the method includes determining, in the at least one distance protection element, an apparent impedance from the one or more local currents and voltages.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method for providing protective control to a tapped line in a power system, comprising the steps of:
   measuring one or more local currents in a first protection element;
   receiving, in the first protection element, one or more remote current measurements from a second protection element;
   calculating one or more differential currents based on the local and remote current receiving one or more local voltages and the one or more local currents in at least one distance protection element;
   determine in the at least one distance protection element, an apparent impedance from the one or more local currents and voltages;
   wherein the at least one distance protection element does not determine the apparent impedance for faults occurring in a busbar of a tapped transformer connected to the tapped line.

2. The method of claim 1, wherein the first and second protective elements are protective relays.

3. The method of claim 2, wherein the first protection element includes the at least one distance protection element.

4. The method of claim 1, wherein the at least one distance protection element determines the apparent impedance for faults occurring along substantially the entire tapped line.

5. The method of claim 1, wherein the at least one distance protection element does not operate during an energization of the tapped transformer.

6. A method for providing protective control to a tapped line in a power system comprising the steps of:
   measuring one or more local currents in a first protection element;
   receiving, in the first protection element, one or more remote current measurements from a second protection element;
   calculating one or more differential currents based on the local and remote current measurements;
   receiving one or more local voltages and the one or more local currents in at least one distance protection element;
   determining, in the at least one distance protection element, an apparent impedance from the one or more local currents and voltages;
   the method further comprising the steps of:
   determining, for an external ground fault, one or more zero sequence currents; and
   subtracting the one or more zero sequence currents from the one or more local currents prior to the step of calculating the one or more differential currents.

7. The method of claim 6, further comprising the steps of:
   generating a first restraining current based on the one or more differential currents; and
   outputting a first protective control signal based on the one or more differential currents and the first restraining current.

8. The method of claim 7, further comprising the steps of:
   determining, for an internal ground fault, one or more second differential currents and one or more second restraining currents from the one or more local currents and the one or more remote currents;
   outputting a second protective control signal based on the one or more second differential currents and the one or more second restraining currents; and
   effecting a protective control operation based on both the first protective control signal and the second protective control signal.

9. A method for providing protective control to a tapped line in a power system, comprising the steps of:
   measuring one or more local currents in a first protection element;
   receiving, in the first protection element, one or more remote current measurements from a second protection element;
   calculating one or more differential currents based on the local and remote current measurements;
   calculating one or more restraining currents based on the one or more differential currents;
   outputting a first protective control signal based on the one or more differential currents and the one or more restraining currents;
   determining one or more zero sequence currents;
   subtracting the one or more zero sequence currents from the local and remote current measurements to generate modified current measurements;
   calculating one or more modified differential currents from the modified current measurements;

calculating one or more modified restraining currents from the modified current measurements; and outputting a second protective control signal based on the one or more modified differential currents and the one or more modified restraining currents.

10. The method of claim 9, further comprising the step of effecting protective control based on both the first and second protective control signals.

11. The method of claim 9, further comprising the steps of:

selecting a minimum of the one or more differential currents and the one or more modified differential currents;

selecting a corresponding restraining signal; and effecting protective control based on the selected differential current and corresponding restraining signal.

12. The method of claim 9, wherein the first and second protection elements are protective relays.

13. The method of claim 9, further comprising the steps of:

receiving one or more local voltages and the one or more local currents in at least one distance protection element;

determining, in the at least one distance protection element, an apparent impedance from the one or more local currents and voltages;

generating a third protective control signal based on the apparent impedance; and effecting protective control based on the first protective control signal, the second protective control signal, and the third protective control signal.

14. The method of claim 13, wherein the at least one distance protection element determines the apparent impedance for faults occurring along substantially the entire tapped line.

15. The method of claim 13, wherein the at least one distance protection element does not determine the apparent impedance for faults occurring in a busbar of a tapped transformer connected to the taped line.

16. The method of claim 15, wherein the at least one distance protection element does not operate during an energization of the tapped transformer.

* * * * *